April 21, 1970 SEIICHIRO SHIGAKI 3,508,207
SUPERVISORY METHOD COMPRISING VARIABLE DELAY-TIME MEMORY
FOR CODE TRANSMISSION SYSTEM
Filed Nov. 16, 1967 3 Sheets-Sheet 1

INVENTOR.
SEIICHIRO SHIGAKI
BY
Hopgood & Calimafde
ATTORNEYS

INVENTOR.
SEIICHIRO SHIGAKI
BY
Hopgood & Calimafde
ATTORNEYS

INVENTOR.
SEIICHIRO SHIGAKI
BY
Hopgood & Calimafde
ATTORNEYS

United States Patent Office 3,508,207
Patented Apr. 21, 1970

3,508,207

SUPERVISORY METHOD COMPRISING VARIABLE DELAY-TIME MEMORY FOR CODE TRANSMISSION SYSTEM

Seiichiro Shigaki, Tokyo, Japan, assignor to Nippon Electric Company, Limited, Tokyo-to, Japan Filed Nov. 16, 1967, Ser. No. 683,587
Claims priority, application Japan, Nov. 19, 1966, 41/76,022
Int. Cl. G11c 7/00
U.S. Cl. 340—172.5 3 Claims

ABSTRACT OF THE DISCLOSURE

A supervisory arrangement for an apparatus coupling the code pulses of two systems having independent clock frequencies and including a convertor with a variable delay-time memory where the input signals are written into the memory by a first clock and the output signals are read by a second clock. It is characterized by the provision of a second variable delay-time memory in which output signal pulses of the converter are written by using the reading address of the first memory as the writing address and the memorized contents are read out by using the writing address of the first memory as the reading address, and a comparator in which the output signal pulses of the second memory are compared with the input signal pulses of the convertor.

BACKGROUND OF THE INVENTION

Conventionally in order to couple the code pulses of two systems having independent clock frequencies (hereinafter "clocks") the method thus far applied couples the code of first system with the code of second system by means of a memory where pulses are written by a clock of the first system and read by a clock of the second system. In an apparatus where such operations are carried out, it is difficult to supervise the operation, because the input code pulse and the output code pulse are regulated by independent clock pulses.

SUMMARY OF INVENTION

This invention is concerned with the method of supervision, in such an apparatus, and is predicated upon the conversion of the output signal of the apparatus into the clock system of the input signal by means of a second memory. In the following, an example will be described, in which the invention is applied to an apparatus for coupling the signals of a first clock system with the signals of a second clock system having higher clock than that in the first clock system.

The above mentioned and other features and objects of this invention and the manner of attaining them will become more apparent and the invention itself will best be understood by reference to the following description of embodiments of the invention taken in conjunction with the accompanying drawing, the description of which follows:

BRIEF DESCRIPTION OF THE DRAWING

FIG. 1 shows a block diagram of the above-mentioned example. In the drawing, circuit 1 converts the signals of the low-speed clock system into those of the high-speed clock system, the circuit being provided with input terminal 10 and output terminal 11. The supervisory circuit, to which the invention is applied, for supervising the circuit 1 is embraced by the dashed lines indicated at 2. In the converting apparatus circuit 12 operates with the input low-speed clock system, circuit 13 operates with the high-speed clock system and memory 14 is where pulses are written by the low-speed clock system and read by the high-speed clock system.

Figure 1:
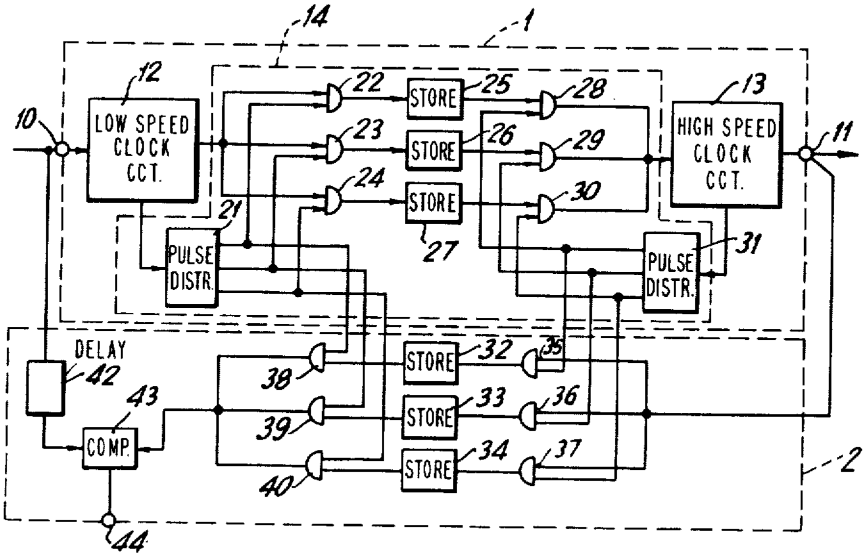
FIG. 1 illustrates a block diagram of an apparatus incorporating the supervisory method of code transmission according to the invention.

In case more delay than a pulse interval is necessary to couple two signal systems, the input signal pulses are separated into *n* circuits, in each of which delay is realized up to *n* times of the initial pulse interval to synthesize all delayed pulses. The example of FIG. 1 shows a case where $n=3$. In the memory 14, a pulse distributor 21 is driven by low-speed clock pulses, and low-speed clock system signals are distributed and written into memory elements 25–27 at the time when gates 22–24 are suitably opened. Pulse distributor 31 is driven by the high-speed clock, and the signals memorized in the memory elements 25–27 are read at the time when gates 28–30 are suitably opened.

In the supervisory circuit 2, on the other hand, gates 35–37 to be opened by the output of a pulse distributor 31 distribute and write the output signals of the apparatus 1 into memory elements 32–34. Gates 38–40 to be opened by the output of the pulse distributor 21, read signals memorized in memory elements 32–34. Comparator 43 compares the output of fixed delay element 42 with that of the gates 38–40.

Figure 2:
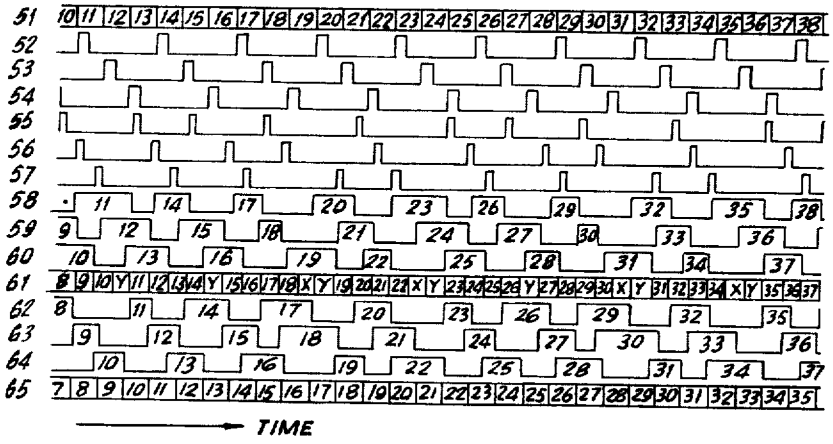
FIG. 2 depicts wave forms illustrating the operation of the block diagram of FIG. 1.

FIG. 2 shows operations of the block diagram represented in FIG. 1. In FIG. 2, 51 is the signal of low-speed clock system; 52 the first output of the pulse distributor 21, applied to the gates 22 and 38; 53 the second output of the pulse distributor 21, applied to the gates 25 and 39; 54 the third output of the pulse distributor 21, applied to the gates 24 and 40; 55 the first output of the pulse distributor 31, applied to the gates 28 and 35; 56 the second output of the pulse distributor 31, applied to the gates 29 and 36; 57 the third output of the pulse distributor 31, applied to the gates 30 and 37; 58–60 the memorized contents in the memory elements 25–27; 61 is the signal of the high-speed clock system circuit 13 and at the same time the output signal of the apparatus 1; 62–64 the memorized contents in the memory elements 32–34; and 65 is the output of the gates 38–40 or 42.

When the circuit 1 shown in FIG. 1 converts the signals of low-speed clock system into those of high-speed clock system, as indicated by the signals of the high-speed clock system 61 of FIG. 2, synchronous pulses Y are produced by demultiplying the high-speed clock pulses in circuit 13 operated by the high-speed clock system shown in FIG. 1 and inserted into the signals of high-speed clock system at a constant interval. And at the durations of synchronous pulses Y, the clock pulses to be fed to the pulse distributor 31 in FIG. 1 are interrupted to provisionally stop the reading of information from the memory element 25–27. Speed regulation pulses X are likewise inserted into the signals of high-speed clock system in the circuit 13. These speed regulation pulses X, for regulating the speed of the high-speed and the low-speed clocks, are necessary for keeping the mean delay amount of signals constant by being inserted before the synchronous pulses Y, where required, by comparing the amount of signal delay due to the memory elements 25–27, that is, the phases of output pulses of the pulse distributor 21 driven by low-speed clock pulses and the pulse distributor 31 driven by high-speed clock pulses. The synchronous pulses Y are necessary at receiving side for determining the speed regulation pulses X inserted in the transmitting side for the speed regulation.

The techniques employed here, particularly as to the X code, are described in detail in U.S. Patent No. 3,042,-751 entitled "Pulse Transmission System." With respect to the adding of the Y code, this is described in an article entitled "A Method of PCM Framing with High Stability," published in Nerem Record (Northeast Electronic Research & Engineering Meeting Record) 1965, p. 164–165.

Low-speed clock system signals 51 in FIG. 2 are written into the memory elements 25–27 with pulses 52–54, memorized in forms 58–60, read with pulses 55–57, converted into signals of high-speed clock system 61 and combined with X and Y to form output.

In this operation, a shift is produced for any time within the interval of three clocks between the output of the pulse distributor 21 (and consequently the input clock signal phase) and the output of the pulse distributor 31 (and consequently the output clock signal phase) thereby changing the delay within this time limit so that the signals receive variable delay by means of the memory 14 which superposes the codes of the input clock on the codes of output clock.

On the other hand, the output signals 61 are written into the memory elements 32–34 of the supervisory apparatus by the pulses 55–57, memorized in forms 62–64 and read by the pulses 52–54 to obtain output 65. The signals 65 regulated by the input low-speed clock are the same as the input signals 51 except that the former has a fixed delay. As this delay is three digits in the case of FIGS. 1 and 2, it is possible to determine whether the operation of the system is normal or not by delaying by three digits (with the delay element 42) and supervising while comparing the output of 42 with those of the gates 38–40 by the comparator 43. Consequently, the output of the comparator 43 permits the supervision of system, its normal use, the change-over to, if any, stand-by facility, etc.

The method according to the invention is characterized in that it is possible to supervise all of the signals regardless of the constitution of the input signal. As can also be estimated from FIG. 2 and the discussion which follows, the memory elements 25–27 and 32–34 work alternately. Referring to the time charts shown in FIG. 2, this operation will be described in the following: In the drawing, an information code 17 in the information code row of the low-speed clock system signals 51 is written into the memory element 25 by the first output 52 of the pulse distributor 21. Consequently, the information signal 17 is memorized, as shown in signal 58, at a time point when the output of the first output 52 of the pulse distributor 21 is emitted. When the first output 55 of the pulse distributor 31 is then emitted, the information signal 17 in the memory element 25 is read at that time point and transmitted to the apparatus 13 to appear as the information signal 17 in its output code row 61. Similarly, 18 and 19 in the information code row 51 are written in the memory elements 26 and 27 by the second and the third outputs 53 and 54 of the pulse distributor 21 and are memorized as shown in 59 and 60, which are read by the second and the third outputs 56 and 57 of the pulse distributor 31 and transmitted to the apparatus 13 to appear as the information codes 18 and 19 in its output code 61. An information code 20 in the information code row 51 is again written into the memory element 25 by the first output 52 of the pulse distributor 21, is memorized as shown in 58 and is read by the first output 55 of the pulse distributor 31 to appear as the information code 20 in the output code 61 through the high-speed clock circuit 13. Thus it is possible to carry out a delay regulation within three clock intervals (a period during which three information codes come) by repeatedly using three memory elements in the same way as described above. The retiming equipment shown in the example has, as will be appreciated by those skilled in the art, functions to suitably determine an interval of the synchronous pulses Y depending upon the different clock systems in the input and output sides so that the above-mentioned delay regulation quantity falls within three clock intervals and to eventually insert the speed regulation code X so that the delay amount does not become more than three clock intervals and less than zero clock interval.

The foregoing describes the working of a conventional variable delay-line memory, that is, buffer memory.

To describe the invention further the information code 17 is written into the memory element 32 at the time point of generation of 55 by the first output 55 of the pulse distributor 31, which is the reading pulse for the memory element 25. Consequently, the information signal 17 is memorized in the memory element 32, as shown in 62, at the time point of generation of the first output 55 of the pulse distributor 31. Then, the information code 17 in the memory element 32 is read by the first output 52 of the pulse distributor 21, which is a writing pulse for the memory element 25, at the time point of generation of 52 and is transmitted to the comparator 43 where the code 17 is compared with the input code row delayed by a suitable fixed time delay element 42. In this case, the period during which the information code is written into the variable delay line memory element 25 and returns from the variable delay line memory element 32, that is, the first output pulse interval of the pulse distributor 32 or a time corresponding to three clocks is selected. This comparison supervises whether the input information codes have been correctly converted into output information codes. It is clear that informations other than the information code 17 are likewise returned from output to input by the repeated use and working of memory elements 32–34 in the same way as the working of the above-mentioned memory elements 25 and 32. As for wave forms 58 and 62 of the memory elements 25 and 32, respectively, 25 is written by the first output 52 of the pulse distributor 21 and read by the first output 55 of the pulse distributor 31. On the other hand, the memory element 32 is written by the first output 55 of the pulse distributor 31 and read by the first output 52 of the pulse distributor 21. 52 and 55 are never superposed, so that the memory elements 25 and 32 work alternately with regard to time, the information being always memorized in one of them while another is blank. It is possible consequently to use in a time-divided manner only 25 in common by making use of 25 as 32 while 25 use. This is shown in FIGS. 3 and 4, in which each corresponding code is the same as that in FIGS. 1 and 2.

The information code 17 in output information code row is written in the memory element 25 by the first output 55 of the pulse distributor 31 immediately after, for instance, 17 in the input information code row has been written by the first output 52 of the pulse distributor 21 and read by the same 55, and it is read by the next pulse in 52. Immediately after that, the information code 20 in the next input information code row is written into 25 by the same pulse in 52.

Figure 3:
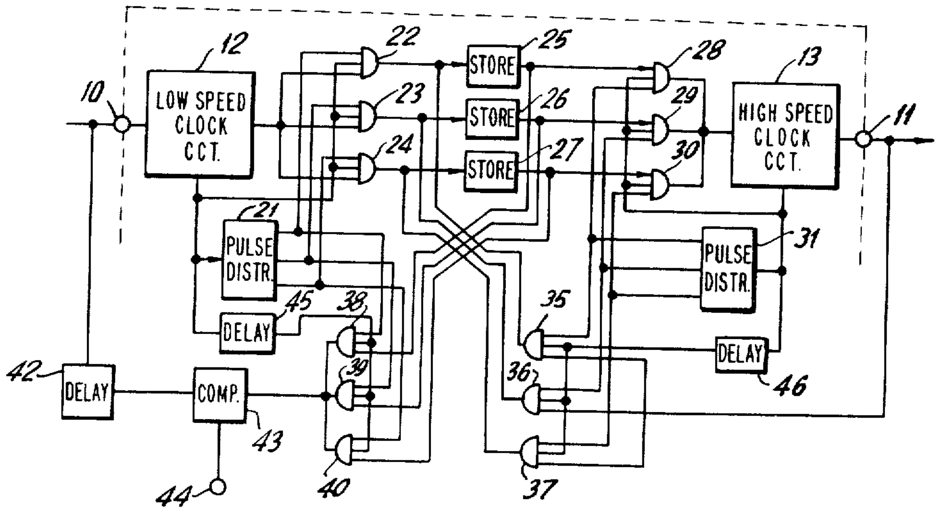
FIG. 3 illustrates an alternative embodiment of the invention.
Figure 4:
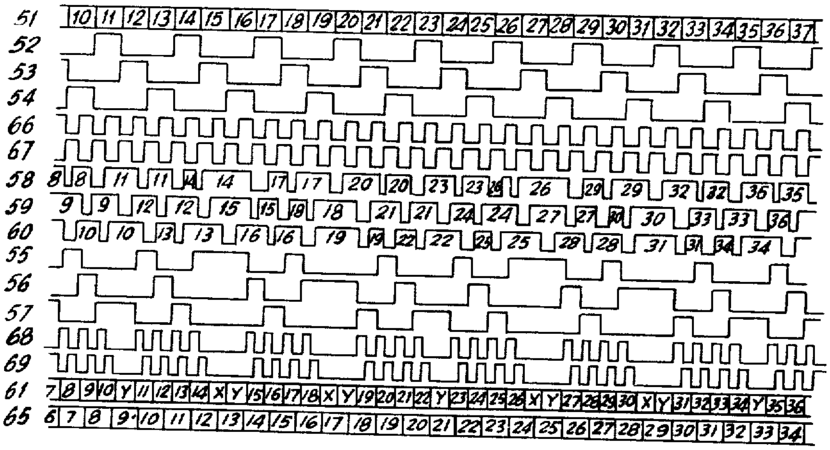
FIGS. 4 and 5 depict wave forms illustrating the operation of the embodiment of FIG. 3.

In FIG. 3, 45 and 46 are delay circuits for clock pulses required for using in a time-divided manner, the memory elements 25–27; the input and output of the delay circuits being represented by 66 and 67 as well as 68 and 69, respectively. If the operation is carried out with a higher-speed clock than the speed of the circuit element, or if it is more advantageous it is possible to effect the same results as in FIG. 4 by increasing the number of memory elements instead of using clock pulses in two phases.

In case any trouble has, on the other hand, occurred in the output side clock so that the reading of the input signal with the output side clock and writing of output signal with the output side clock are interrupted, it may happen that it is not detected in the method according to FIG. 3, because the input signals are directly written and read by the input side clock and return to the comparator 43 as is. To prevent this, it is necessary to use a circuit in which no trouble can occur to interrupt the reading and writing by the output side clock, or to detect trouble on the output side clock by other means. This can be solved by making a specific memory element memorize different signals during the going and returning functions. For this purpose, it is sufficient to realize a delay of one digit between the output 11 of the apparatus shown in FIG. 3 and the gates 35–37 of the supervisory apparatus. Working wave forms of this case are shown in FIG. 5.

Figure 5:
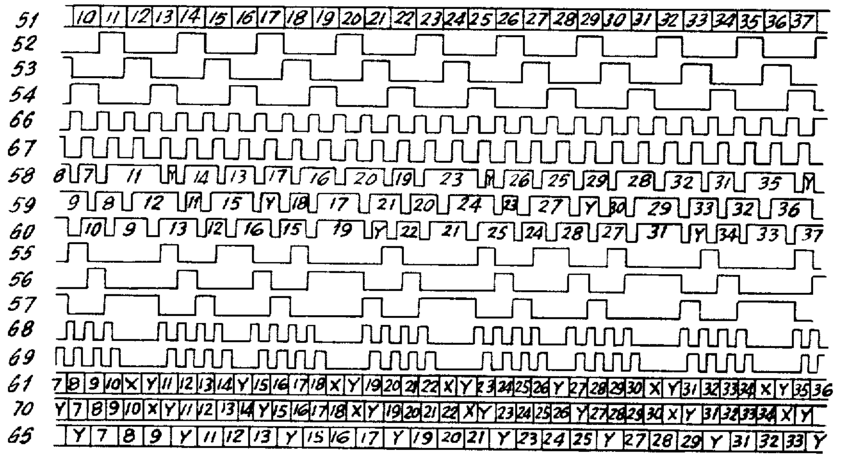

In FIG. 5, 70 is a result of the delay, by one digit, of the output signal 61 and the contents of the memory elements 58–60 are delayed by one digit during returning in comparison with those of FIG. 4, because 70 is written into the memory elements 25–27 by the pulses 55–57, 68 and 69. While supervision is carried out, in this case, by making the delay time of the delay element 42 4 digits, it is impossible to supervise for a period during which, as shown in 65 of FIG. 5, a part of the signals and the synchronous pulses Y return to the input side in the examples of FIG. 1 in which signals other than input signals are superposed on the output side and FIG. 5, respectively. Regardless of the abov-mentioned example, the supervisory method according to the invention can be applied to the supervision of a communication system provided with memories which write input signals with an input clock and read output signals with an output clock.

While the principles of the invention have been described in connection with specific apparatus, it is to be clearly understood that this description is made only by way of example and not as a limitation to the scope of the invention as set forth in the objects thereof and in the accompanying claims.

I claim:

1. In an arrangement, for coupling code transmissions at independent clock frequencies, of the type including a variable delay convertor having a memory which is written into with input signal pulses at the first clock frequency and read out of to produce output signals at the second clock frequency, an improved supervisory circuit comprising:

a second memory;

means for writing the said output signal pulses of the convertor in said second memory with the reading address of the first memory as the writing address;

means for reading out the memorized contents of said second memory, with the writing address of the first memory as the reading address;

and a comparator for comparing the output signal pulses of the second memory with the input signal pulses of said convertor.

2. The improved supervisory circuit claimed in claim 1 wherein said comparator includes a delay element coupled to the input of said convertor and having a delay greater than the delay of said signal through said convertor.

3. The improvement claimed in claim 1 wherein said supervisory circuit further includes means for time-wise dividing said first mentioned memory into first and second memories, and means for employing said first memory as the convertor memory and said second memory as the memory in said supervisory circuit.

References Cited

UNITED STATES PATENTS

| | | |
|---|---|---|
| 3,362,014 | 1/1968 | Hauck. |
| 3,340,515 | 9/1967 | Little. |
| 3,208,050 | 9/1965 | Bird et al. |
| 3,158,839 | 11/1964 | Anderson. |

GARETH D. SHAW, Primary Examiner